(12) United States Patent
Loebig

(10) Patent No.: US 11,713,722 B2
(45) Date of Patent: Aug. 1, 2023

(54) GAS TURBINE ENGINE COMPRESSOR PARTICULATE OFFTAKE

(71) Applicant: Rolls-Royce Corporation, Indianapolis, IN (US)

(72) Inventor: James Carl Loebig, Greenwood, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 179 days.

(21) Appl. No.: 16/870,269

(22) Filed: May 8, 2020

(65) Prior Publication Data

US 2021/0348568 A1 Nov. 11, 2021

(51) Int. Cl.
*F02C 9/18* (2006.01)
*F02C 7/052* (2006.01)

(52) U.S. Cl.
CPC ............... *F02C 9/18* (2013.01); *F02C 7/052* (2013.01); *F05D 2220/323* (2013.01); *F05D 2240/14* (2013.01); *F05D 2260/606* (2013.01); *F05D 2260/607* (2013.01); *F05D 2270/44* (2013.01)

(58) Field of Classification Search
CPC .. F02C 7/052; F02C 7/055; F02C 7/06; F02C 9/18; F02C 6/08; B64D 2013/0607
See application file for complete search history.

(56) References Cited

U.S. PATENT DOCUMENTS

| 3,979,903 | A | * | 9/1976 | Hull, Jr. | ............... F02C 7/05 60/39.23 |
| 3,993,463 | A | | 11/1976 | Barr | |
| 4,149,689 | A | * | 4/1979 | McDonald | ............. B64D 33/02 244/134 C |
| 4,155,680 | A | * | 5/1979 | Linko, III | ................. F02C 7/25 415/121.2 |
| 4,463,552 | A | | 8/1984 | Monhardt et al. | |

(Continued)

FOREIGN PATENT DOCUMENTS

| EP | 1426588 A1 | 6/2004 |
| EP | 2584142 A2 | 4/2013 |

OTHER PUBLICATIONS

Flight Mechanics—Gas Turbine Engines—Axial-Flow Compressor (https://www.flight-mechanic.com/gas-turbine-engines-axial-flow-compressors/) (Year: 2021).*

*Primary Examiner* — Todd E Manahan
*Assistant Examiner* — Thuyhang N Nguyen
(74) *Attorney, Agent, or Firm* — Shumaker & Sieffert, P.A.

(57) ABSTRACT

In general, techniques are described by which to provide a turbine engine compressor particulate offtake. A gas turbine engine comprising a compressor may perform the techniques. The compressor may comprise a plurality of compressor stages, where each compressor stage comprises a circumferential row of stator vanes and a rotor. The compressor may also include an outer circumferential casing that defines a fluidic opening within or between adjacent compressor stages. The fluidic opening may be configured to receive particulate flowing and air through the compressor and output the particulate and air outside of the gas turbine engine. The gas turbine engine also includes a combustor in series flow downstream of the compressor, and a turbine in series flow downstream of the combustor.

19 Claims, 5 Drawing Sheets

(56) References Cited

U.S. PATENT DOCUMENTS

| | | | | |
|---|---|---|---|---|
| 5,044,153 A * | 9/1991 | Mouton | ................ | F02C 9/18 |
| | | | | 55/306 |
| 5,203,162 A * | 4/1993 | Burge | ................ | F04D 29/522 |
| | | | | 60/785 |
| 7,624,581 B2 * | 12/2009 | Moniz | ................ | F04D 27/0215 |
| | | | | 60/785 |
| 8,899,050 B2 * | 12/2014 | Alasti | ................ | F01D 11/24 |
| | | | | 60/785 |
| 9,046,056 B2 * | 6/2015 | Lerg | ................ | F02C 7/055 |
| 9,623,354 B2 | 4/2017 | Kumar et al. | | |
| 9,945,260 B2 * | 4/2018 | Lukowski | ................ | F02K 3/075 |
| 10,030,539 B2 * | 7/2018 | Ronan | ................ | F02K 3/04 |
| 11,035,372 B2 * | 6/2021 | Caratge | ................ | F04D 27/0215 |
| 11,111,855 B2 * | 9/2021 | Dierksmeier | ................ | F02C 7/042 |
| 11,199,131 B2 * | 12/2021 | Morita | ................ | F04D 19/02 |
| 2008/0072606 A1 * | 3/2008 | Higgins | ................ | F02C 7/052 |
| | | | | 60/39.092 |
| 2014/0109589 A1 * | 4/2014 | Pritchard, Jr. | ................ | F02K 3/075 |
| | | | | 60/779 |
| 2015/0159560 A1 * | 6/2015 | Kumar | ................ | F02C 9/18 |
| | | | | 60/779 |
| 2016/0326957 A1 * | 11/2016 | Feulner | ................ | F04D 29/701 |
| 2017/0058783 A1 | 3/2017 | Tan et al. | | |
| 2017/0101937 A1 * | 4/2017 | Schlarman | ................ | F02C 3/04 |
| 2019/0202567 A1 * | 7/2019 | Epp | ................ | B64D 13/08 |
| 2020/0131996 A1 | 4/2020 | Hanlon et al. | | |

\* cited by examiner

GAS TURBINE ENGINE COMPRESSOR PARTICULATE OFFTAKE

TECHNICAL FIELD

The disclosure relates to gas turbine engines.

BACKGROUND

In some applications, engines may operate in harsh conditions in which particulates may enter the engine and cause damage to or otherwise compromise operation of internal components of the engine. For example, gas turbine engines having one or more turbines may operate at high temperatures (following combustion of compressed air) in which turbine stator vanes and turbine blades may be coated with melted sand or other particulates that block air flow through the turbine, damage protective coatings on the turbine blades, or the like, thereby potentially damaging or preventing operation of the gas turbine engine or otherwise reducing engine efficiency (in terms of thrust and shaft horsepower per unit of fuel). In addition, particles which do not melt erode the turbine blades, endwalls and vanes causing component efficiency losses due to profile changes and tip clearance increases.

SUMMARY

In one example, the disclosure is directed to a gas turbine engine comprising: a compressor comprising a plurality of compressor stages, wherein each compressor stage comprises a circumferential row of stator vanes and a rotor, wherein an outer circumferential casing of the compressor defines a fluidic opening within or between adjacent compressor stages, and wherein the fluidic opening is configured to receive particulate flowing and air through the compressor and output the particulate and air outside of the gas turbine engine; a combustor in series flow downstream of the compressor; and a turbine in series flow downstream of the combustor.

In another example, the disclosure is directed to a method comprising: controlling, by a controller, a particulate offtake valve to open at a first time, wherein the particulate offtake valve is fluidically coupled to a fluidic opening defined in an outer circumferential casing of a compressor of a gas turbine engine, wherein the gas turbine engine comprises the compressor, a combustor in series flow downstream of the compressor, and a turbine in series flow downstream of the combustor, wherein the compressor comprises a plurality of compressors stages, wherein each compressor stage comprises a circumferential row of stator vanes and a rotor, wherein the fluidic opening is within a compressor stage or between compressor stages; and controlling, by a controller, the particulate offtake valve to close at a second time.

The details of one or more examples are set forth in the accompanying drawings and the description below. Other features, objects, and advantages of the disclosure will be apparent from the description and drawings, and from the claims.

DETAILED DESCRIPTION

The disclosure describes a gas turbine engine in which one or more compressors are configured to expel particulates (or, in other words, particulate matter), such as sand, ash, or other particulates by way of a particulate offtake. The one or more compressors may include compressor stator vanes and compressor rotors by which to compress air (increase the pressure) prior to combustion. The operation of the compressor rotors may drive any particulate to the inner surface of the outer circumferential casing of the compressor, which may include a fluidic opening within or between adjacent compressor stages (in the instance where the gas turbine engine includes multiple compressor stages) configured to receive the particulate flowing through the compressor and thereby redirect or otherwise output the particulate outside of the gas turbine engine.

The compressor rotors may naturally force air and the particulates into the fluidic opening due to centrifugal forces, which may couple to the particulate offtake allowing the particulate to be expelled from the engine. A controller may regulate particulate offtake using a particulate offtake valve, which may be opened and closed depending on operation of the vehicle (e.g., an airplane, a helicopter, or another rotary-wing vehicle) to which the gas turbine engine is coupled. As allowing air and particulates to be output via the particulate offtake may reduce available engine power and/or engine efficiency, the controller may only open the particulate offtake valve during takeoff, climbing, or landing, and may close the valve during cruising (see cruise exceptions above) or full power requests.

By allowing ingested particulates to be expelled, the particulate offtake system (which may refer to the fluidic opening in combination with the particulate offtake valve and the particulate offtake pipe and control system) may reduce the impact of particulates in compressors (especially compressor stages following particulate offtake opening), combustors, and/or turbines. Turbine vane flow path blockage (due to sand melt and re-solidification) in turbines, for example, may be reduced along with turbine erosion. As another example, turbines may lose efficiency due to particulates, which may cause coating and/or substrate erosion on blades and/or vanes, thermal barrier coating damage on blades or vanes, local deposition of glasses formed by melted particulates, and endwall deterioration, and/or accumulate and block airfoil cooling passages. Erosion of compressor rotor blades and stator vanes may also occur. Allowing particulate offtake in accordance with various aspects of these techniques may reduce the foregoing impacts of particulates on the gas turbine engine, thereby potentially increasing operation durations and/or efficiency of the gas turbine engine (or an amount of time between engine overhauls).

Figure 1:
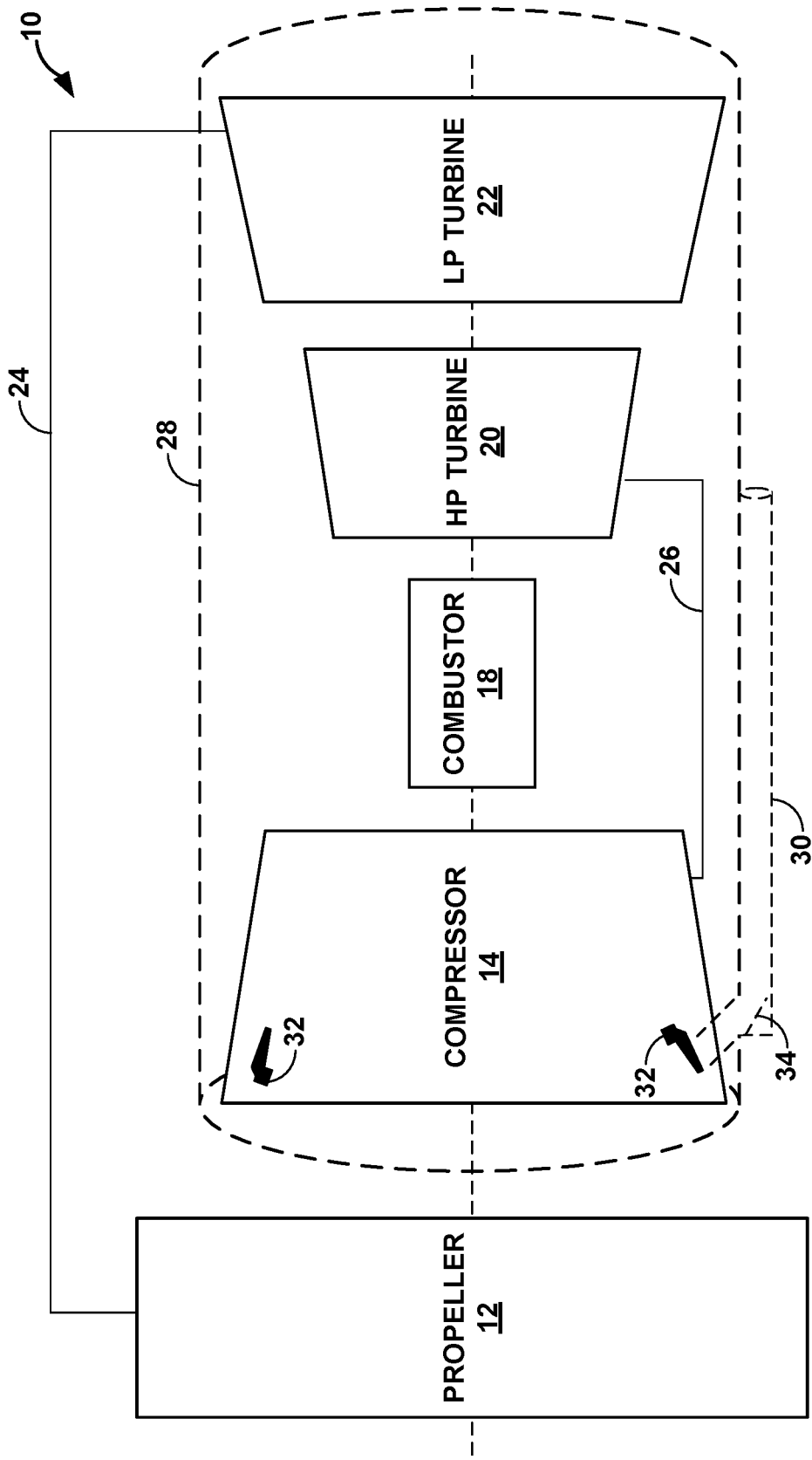
FIG. 1 is a conceptual diagram illustrating an example gas turbine engine that includes a particulate offtake configured to operate in accordance with one or more aspects of the present disclosure.

FIG. 1 is a conceptual diagram illustrating an example gas turbine engine that includes a particulate offtake configured to operate in accordance with one or more aspects of the present disclosure. Gas turbine engine 10 is a primary propulsion engine that provides shaft horsepower for flight operations of a vehicle, such as an aircraft. In some examples, gas turbine engine 10 is a two-spool engine having a low pressure (LP) spool 24 and a high pressure (HP) spool 26. In other examples, gas turbine engine 10 may include a single spool or three or more spools, e.g., may include an intermediate pressure (IP) spool and/or other spools. In some examples, gas turbine engine 10 may include any suitable turbine powered-engine propulsion system, including but not limited to, a turboprop engine or a turboshaft engine (including rotary wing aircraft).

Gas turbine engine 10 includes a, a compressor 14, a combustor 18, a high pressure (HP) turbine 20, and a low pressure (LP) turbine 22, each of which is fluidically disposed in series with respect to one another as shown in the example of FIG. 1. That is, air enters compressor 14, which produces first stage compressed air that is directed into combustor 18.

Combustor 18 is fluidically disposed between compressor 14 and HP turbine 20, and as such is in series flow downstream from compressor 14. In some examples, combustor 18 includes a combustion liner (not shown) that encloses a continuous combustion process using the compressed air and fuel. In other examples, combustor 18 may take other forms, and may be, for example, a wave rotor combustion system, a rotary valve combustion system, a pulse detonation combustion system, or a slinger combustion system, and may employ deflagration and/or detonation combustion processes. Combustor 18 outputs the result of burning the fuel as hot expanding gases.

HP turbine 20 is fluidically disposed between combustor 18 and LP turbine 22, and as such is in series flow downstream of combustor 18. HP turbine 20 utilizes the hot expanding gases to drive HP spool 26, which in turn drives compressor 14. The hot expanding gases pass through HP turbine 20 to LP turbine 22, thereby driving LP spool 24. LP spool 24 is coupled to a gearbox, which provides mechanical energy to drive propeller 12. Propeller 12 provides thrust, lift, and/or rotational control for the aircraft (such as a helicopter—where such propellers may be referred to as a rotor—or propeller-driven airplanes, including rotary wing aircraft).

Compressor 14 includes one or more compressor stages. Each compressor stage may include a compressor stator vane row along the axial circumference of gas turbine engine 10 and a compressor rotor (which may refer to compressor blades attached along an axial circumference of a rotor disc), both of which are not shown for ease of illustration purposes in the example of FIG. 1. The compressor rotors for compressor 14 are spun between the compressor stator vane rows of compressor 14 via HP spool 26 to produce the compressed air.

Each of HP turbine 20 and LP turbine 22 include one or more turbine stages. Each turbine sage may include a stator vane row along the axial circumference of gas turbine engine 10 and a turbine rotor (which may refer to turbine blades attached along an axial circumference of a rotor disc), both of which again are not shown in the example of FIG. 1 for ease of illustration purposes. The gas emitted by combustor 18 drives the turbine rotors of HP turbine 20 and LP turbine 22, which spin between the respective stator vane rows of HP turbine 20 and LP turbine 22. The rotation or spinning drives respective HP spool 26 and LP spool 24, which as noted above drive compressor 14, and propeller 12.

Gas turbine engine 10 also includes a casing 28 surrounding or otherwise forming portions of compressor 14, combustor 18, HP turbine 20, LP turbine 22 and possibly other components of gas turbine engine 10 that are not shown for ease of illustration in the example of FIG. 1. For example, the above noted compressor stator vane rows may be affixed to casing 28. Likewise, the turbine stator vane rows may be affixed to casing 28.

To maximize efficiency of gas turbine engine 10, the compression stator vanes in each row and the rotor blades are configured to produce a desired compression ratio of input air pressure to output air pressure. Similarly, to maximize efficiency of gas turbine engine 10, spacing between turbine stator vanes in each row and the blades of turbine rotors are configured so as to produce a desired ratio of mechanical energy to input energy (in terms of fuel expended).

While such spacing may maximize the efficiency of gas turbine engine 10 (in terms of fuel expended—or in other words, energy input—per energy output), the spacings and tight tolerances may result in damage when subjected to the presence of large amounts of particulates. In certain applications, such as field landings and/or takeoffs (particularly on sand) by aircraft or when flying through ash or other debris particulate, gas turbine engine 10 may ingest large quantities of particulates. Considering that casing 28 may effectively create a closed system, gas turbine engine 10 may experience large amounts of wear when repeatedly subjected to the particulates as there is no way to expel the particulates except out the axial end of LP turbine 22.

To illustrate, the particulates may block turbine vane flow paths, which may render gas turbine engine 10 inoperable or reduce turbine efficiency (in terms of the ratio of energy input to energy output). As another example, particulates may also reduce turbine efficiency by causing erosion, thermal barrier coating damage, local deposition, endwall deterioration, and/or through accumulation and blocking of airfoil cooling passages. Further, the particulates may damage compressors (e.g., erosion of compressor rotors and stator vanes), decreasing compressor efficiency. When efficiencies decrease sufficiently (e.g., such efficiencies cannot be restored using engine washes), gas turbine engine 10 will be overhauled at considerable expense (not only in terms of the actual overhaul but also in terms of an inability to utilize the aircraft).

In accordance with various aspects of the techniques described in this disclosure, gas turbine engine 10 may include one or more of compressor 14 that are configured to expel particulates (or, in other words, particulate matter), such as sand, ash, dirt, dust, or other particulates by way of a particulate offtake pipe 30. In the example of FIG. 1, only compressor 14 is shown coupled to particulate offtake pipe 30. However, in instances where there are multiple compressor stages (e.g., a LP compressor and a HP compressor), each compressor stage may be coupled to particulate offtake pipe 30 or to a separate particulate offtake pipe similar to particulate offtake pipe 30. In other instances, only one stage of a multistage compressor may be coupled to particulate offtake pipe 30. Moreover, particulate offtake pipe 30 may reside, in still other instances, between stages of a multi-stage compressor (whether or not one or more of the stages are coupled to particulate offtake pipe 30 or a separate particulate offtake pipe similar to particulate offtake pipe 30).

In any event, the operation of the compressor rotors may drive any particulate to the inner surface of the outer circumferential casing of the compressor (which is represented as casing 28 in the example of FIG. 1), which may include a fluidic opening within or between adjacent compressor stages (in the instance where gas turbine engine 10 includes multiple compressor stages). The fluidic opening may be configured to receive the particulate flowing through compressor 14 and thereby redirect the particulate to particulate offtake pipe 30.

The fluidic opening is shown as a slot 32 in the example of FIG. 1. Slot 32 resides within compressor 14 as part of an offtake particulate system for coupling to particulate offtake pipe 30. Further, slot 32 may reside between stages of a multi-stage compressor for coupling particulate offtake pipe 30 between, as one example, a LP compressor stage and a HP compressor stage (again, whether or not the LP compressor stage and/or the HP compressor stage are coupled to particulate offtake pipe 30 or a separate particulate offtake pipe similar to particulate offtake pipe 30). In some examples, gas turbine engine 10 may include multiple fluidic openings at different axial locations within compressor 14. Regardless of the particular configuration, slot 32 may receive particulate flowing through compressor 14 and output the particulate outside of gas turbine engine 10.

The compressor blades (which again may also be referred to as compressor rotors) may naturally force air and the particulates into slot 32 (which is one example of a fluidic opening) due to centrifugal forces, which may couple to particulate offtake pipe 30 allowing the particulate to be expelled from gas turbine engine 10. A controller (not shown in the example of FIG. 1) may regulate particulate offtake pipe 30 using a particulate offtake valve 34, which is fluidically coupled to slot 32 and particulate offtake pipe 30 and may be opened and closed depending on operation of the aircraft (e.g., a helicopter, airplane, or rotary-wing aircraft) to which gas turbine engine 10 is coupled. As allowing air and particulates to be output via particulate offtake pipe 30 reduces efficiency and/or maximum power of gas turbine engine 10, the controller may only open particulate offtake valve 24 during selected periods of operation, such as takeoff, climbing, or landing, and may close the valve during other selected periods of operation, such as cruising.

In this sense, the particulate offtake system (including slot 32, particulate offtake valve 34, and particulate offtake pipe 30) may represent a bleed subsystem for gas turbine engine 10, as the particulate offtake system may remove air and particulate from the flow path of compressor 14, outputting the air and particulate overboard (e.g., outside of gas turbine engine 10). The bled air may result in lower mass flow to downstream components (i.e., combustor 18, HP turbine 20, and LP turbine 22 in the example of FIG. 1), which may impact engine power (e.g., a 0-10% power loss). As such, operation of the particulate offtake system may be limited to certain particulate ingestion scenarios, such idling, takeoff, climbing, and/or landing.

Although described as becoming operational in certain particulate ingestion scenarios, the particulate offtake system may be manually operated, dependent on operating conditions of the aircraft (e.g., idling, takeoff, climbing, and/or landing), responsive to certain conditions, and/or different for different types of aircraft. For example, aircraft may not require as much power during landing, and as such, leave particulate offtake valve 34 open during landing. However, helicopters may, during landing, require maximum power which may override opening of particulate offtake valve 34.

By allowing ingested particulates to be expelled, the particulate offtake system may reduce the effect of particulates in both compressor 14, HP turbine 20, and LP turbine 22. Compressor 14 may, as one example, reduce erosion by expelling particulates via the particulate offtake system, thereby protecting compressor axial stages aft of the particulate offtake system within compressor 14. Turbine vane flow path blockage (due to sand melt and re-solidification) in HP turbine 20 and LP turbine 22, for example, may be reduced. As another example, erosion, thermal barrier coating damage, local deposition, and endwall deterioration, as well as accumulation and blocking of airfoil cooling passages in HP turbine 20 and/or LP turbine 22 may be reduced. Allowing particulate offtake in accordance with various aspects of this techniques may reduce the foregoing impacts of particulates on gas turbine engine 10, thereby potentially increasing operation durations of gas turbine engine 10 (or an amount of time between engine overhauls).

Although shown as residing on the bottom of gas turbine engine 10 that is assumed to be mounted on the aircraft horizontally, particular offtake pipe 30 and particulate offtake valve 34 may be located in different locations on gas turbine engine 10 to accommodate different orientations of gas turbine engine 10 when mounted on the aircraft. The bottom location of particulate offtake pipe 30 and particulate offtake valve 34 may allow for gravity to facilitate removal of the particulate from gas turbine engine 10 when gas turbine engine 10 is mounted horizontally on the aircraft. However, when gas turbine engine 10 is mounted vertically on the aircraft (which may occur for helicopters or in a configuration for rotary-wing aircraft), particulate offtake pipe 30 and particulate offtake valve 34 may be located in different locations. In addition, although described with respect to a single slot 32 (which again is one example of a fluidic opening), casing 28 may include one or more fluidic openings at different axial locations of compressor 14, between a LP compressor and a HP compressor in multi-stage compressors, and/or a HP compressor (again for multi-stage compressors).

Figure 2:
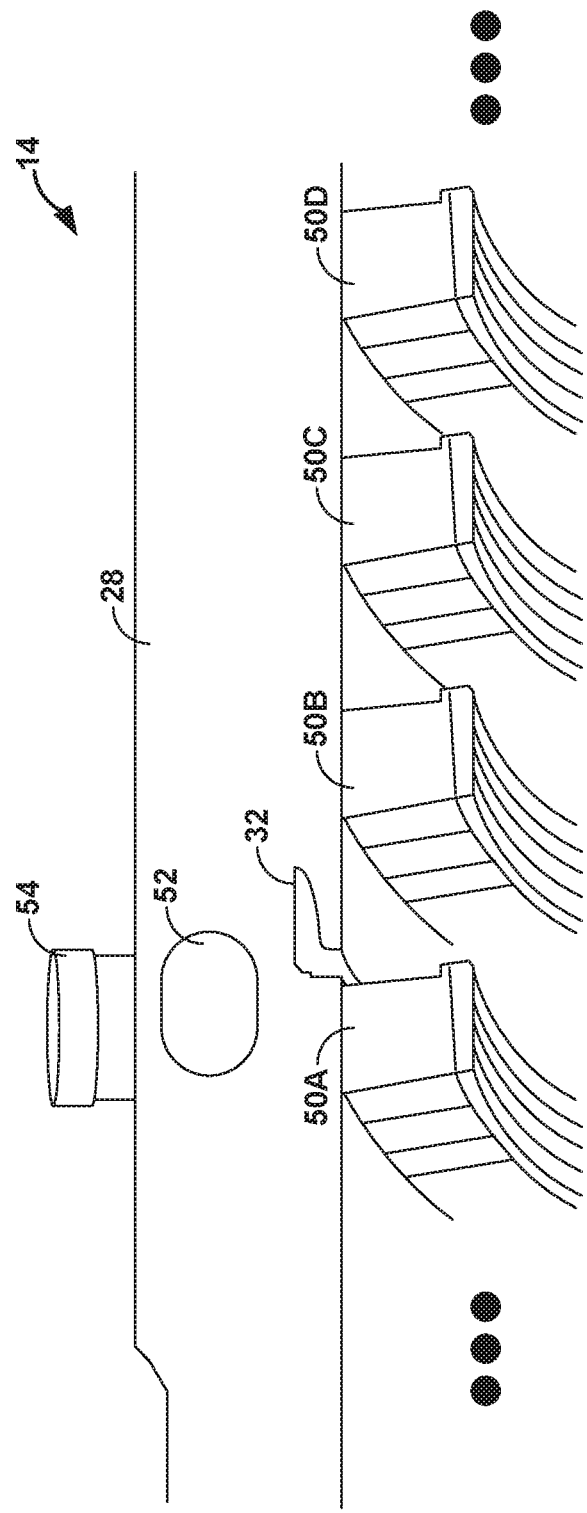
FIG. 2 is a diagram illustrating a radial cross-sectional view of the compressor shown in the example of FIG. 1 that includes the fluidic opening for particulate offtake in accordance with various aspects of the techniques described in this disclosure.

FIG. 2 is a diagram illustrating a radial cross-sectional view of a portion of compressor 14 shown in the example of FIG. 1 that includes the fluidic opening for particulate offtake in accordance with various aspects of the techniques described in this disclosure. As shown in the example of FIG. 2, compressor stator vane rows 50A-50D ("stator vanes rows 50") are affixed to or otherwise formed as part of casing 28. Fluidic opening 32 (which is shown as a slot in the example of FIG. 2, and therefore may be referred to as "slot 32") also exists within casing 28 (e.g., is defined in casing 28), potentially as an annular slot extending substantially continuous (above 90%) about an inner surface of outer circumferential casing 28. That is, slot 32 may extend nearly the entire circumference in a plane orthogonal to the longitudinal axis of engine 10 (which may be referred to as an axial circumference) of casing 28 as a continuous slot for collection of particulate and air.

In some instances, slot 32 may represent a plurality or number of different slots that together extend discontinuously around the inner surface of outer circumferential casing 28. In other words, slot 32 may represent sections of slots (which may in some examples form round or shaped holes) dispersed around the inner surface of the axial circumference of casing 28, which extends all the way around a rotational axis of gas turbine engine 10 (but may be manufactured as two or more parts that are assembled to form casing 28).

As further shown in the example of FIG. 2, slot 32 may be located between adjacent stator vane rows of stator vane rows 50 (i.e., stator vane rows 50A and 50B in the example of FIG. 2). Although only four rows of stator vane rows 50 are shown in the example of FIG. 2, compressor 14 may include more or fewer stator vane rows of stator vane rows 50. Further, slot 32 may be located at any point within stator vane rows 50 and/or rotor blade rows, either aft or fore of and possibly within the rotor blade rows (which are not shown) or stator vane rows. A compressor having such an arrangement of stator vane rows and rotors may be referred to as an axial compressor, and compressor 14 may be referred to as a "axial compressor 14" for this reason.

Although described with respect to axial compressors, various aspects of the techniques may also apply to axial compressors with a single stage centrifugal arrangement (so-called axial-centrifugal compressors). Further, as noted above, compressor 14 may have a single stage or multiple stages, where multi-stage compressors may include a single spool or multiple spools. Moreover, as compressor 14 couples to HP turbine spool 26, compressor 14 may be referred to as "HP axial compressor 14."

HP axial compressor 14 naturally centrifuges particles to casing 28 (or, in other words, the outer end wall—OEW—of the compressor flow path) because of the circumferential component of the velocity imparted to the air from alternating stator vane rows and blade rows of the rotors for each internal stage of HP axial compressor 14. An internal stage of HP axial compressor 14 may refer to a circumferential row of stator vanes adjacent to a circumferential row of rotor blades. HP compressor 14 may include one or more internal stages.

In any event, given how particulates are ingested at higher concentrations toward the center of gas turbine engine 10 at earlier internal stages of HP axial compressor 14 and is dispersed outward toward OEW at later internal stages, slot 32 may be located at middle or later stages of HP axial compressor 14 to receive more particulates. Determining a location of one or more slots similar to slot 32 may be dependent on dimensions of casing 28, requiring analysis of casing 28 with respect to where particulate concentration is highest within HP axial compressor 14.

Further, analysis of bleed rate for slot 32 located at different locations within HP axial compressor 14 may determine at which location slot 32 should be placed. That is, at later internal stages of HP axial compressor 14, slot 32 may bleed more air for the same unit of time compared to earlier internal stages (given that each stage increases pressure), thereby potentially impacting power loss of gas turbine engine 10 to different degrees. As such, in some examples, where particulate analysis concentration and bleed rate indicate moderate power loss (again within the range of 0-10%) at a high particulate concentration for a mid-internal stage of HP axial compressor 14, slot 32 may be located fore or aft of a mid-internal stage row of the blade row or the mid-internal stage row of stator vane rows 50.

In some examples, gas turbine engine 10 may include a pre-existing slot 32 in casing 28 used for bleeding air during engine start conditions. Such pre-existing slots may be repurposed for particulate offtake systems, thereby potentially providing weight advantages for combining the particulate offtake location of slot 32 with the engine start bleed. However, a separate controller or control algorithm may control particulate offtake valve 34 (not shown in the example of FIG. 2), as the valve for bleed during engine start conditions may be driven by pressure differences between the interior of casing 28 and the exterior of casing 28 and not the particular conditions noted above for operating particulate offtake valve 34. I Whether using a preexisting slot or a new slot, slot 32 couples to a manifold 52 within casing 52 that allow fluidic coupling to particulate offtake pipe 30 and particulate offtake valve 34 (which are not shown in the example of FIG. 2). In the example of FIG. 2, slot 32 is assumed to be a pre-existing slot used for bleed during engine start conditions, where manifold 52 is fluidically coupled to an engine start bleed valve 54.

Figure 3A:
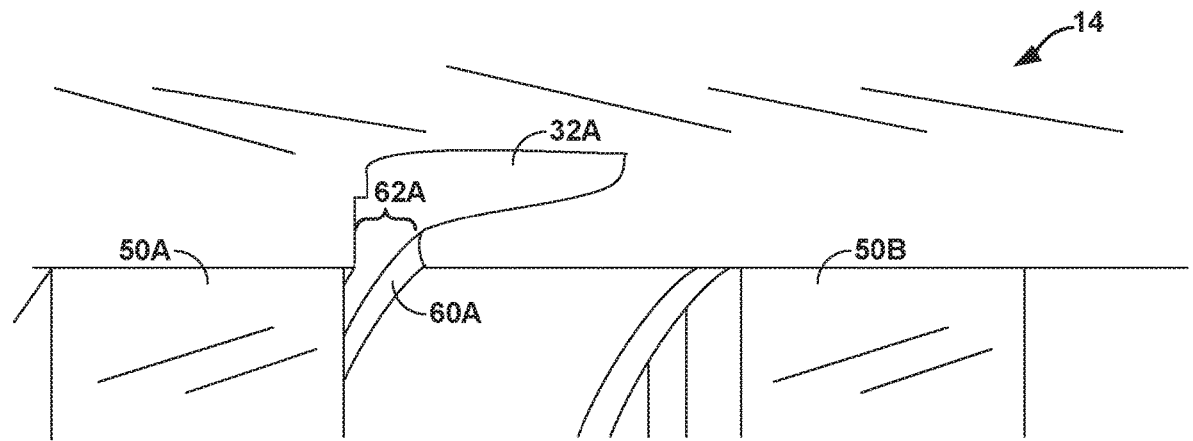
FIGS. 3A and 3B are diagrams illustrating a portion of a radial cross-sectional view of the compressor shown in the example of FIG. 2 in more detail.
Figure 3B:
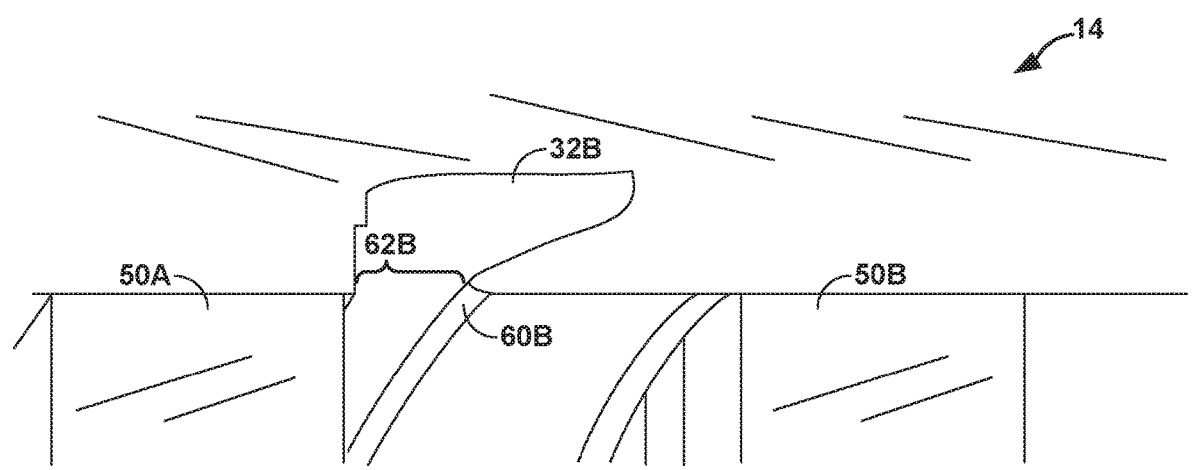

FIGS. 3A and 3B are diagrams illustrating a portion of a radial cross-sectional view of the compressor shown in the example of FIG. 2 in more detail. In the example of FIG. 3A, HP axial compressor 14 includes a version of slot 32 (denoted as slot 32A) having a particular geometry with a flat leading edge 60A. Although shown having a particular geometry, fluidic opening 32A may include a plurality of fluidic openings 32A (which may resemble holes having various shapes, such as parallelogram with corner radii at various circumferential locations, circles or elliptical). When fluidic opening 32A is representative of a series of holes, the holes may be placed between vanes in a circumferential row of stator vanes, such as interleaved between the vanes of stator vane row 50A.

In the example of FIG. 3B, HP axial compressor 14 includes a slot 32 (denoted as slot 32B) having a different geometry. Leading edge 60B of slot 32B is rounded compared to leading edge 60A of slot 32A. In addition, opening 62B of slot 32B has been widened compared to opening 62A of slot 32A. That is, slot 32A has a narrower opening 62A compared to opening 62B of slot 32B. For both slot 32A and slot 32B, slot 32A and 32B may each be bounded on an inner surface of the outer circumferential casing 28 by a portion of the outer circumferential casing that overhangs a portion of the slot 32A/32B extending from an axially rearward end of the slot in an axially forward direction.

Figure 4:
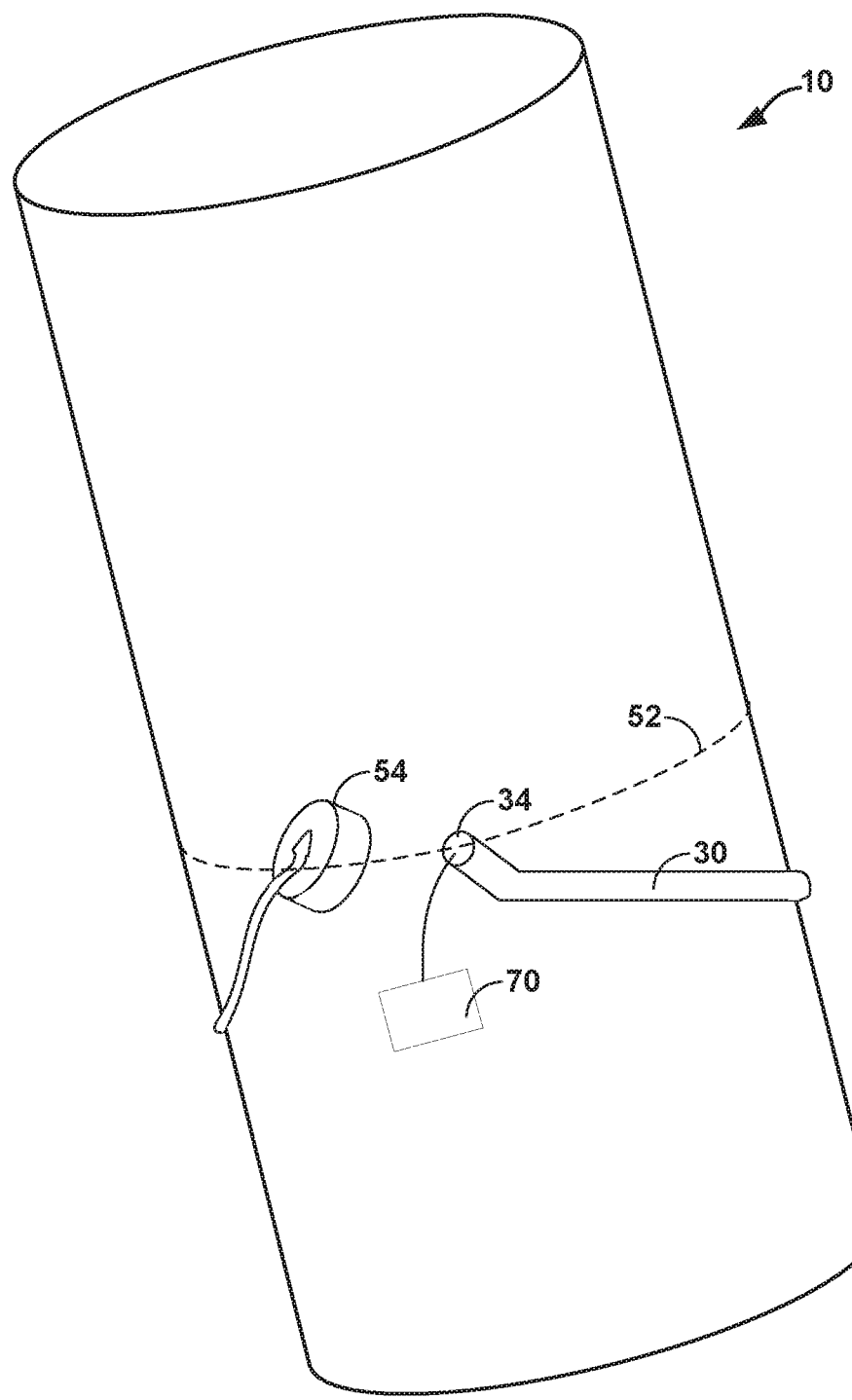
FIG. 4 is a diagram illustrating an exterior of the gas turbine engine shown in the example of FIG. 1 that is configured to reutilize a pre-existing slot for particulate offtake in accordance with various aspects of the techniques described in this disclosure.

FIG. 4 is a diagram illustrating a simplified exterior of the gas turbine engine 10 shown in the example of FIG. 1 that is configured to reutilize a pre-existing slot for particulate offtake in accordance with various aspects of the techniques described in this disclosure. As shown in the example of FIG. 4, gas turbine engine 10 includes particulate offtake pipe 30, particulate offtake valve 34, bleed engine start valve 54 (which fluidically couples to manifold 52 shown in the example of FIG. 2 and denoted by dashed line 52), and a controller 70.

As noted above, manifold 52 may fluidically couple to slot 32 (which is not shown in the example of FIG. 4), particulate offtake valve 34, and bleed engine start valve 54. Bleed engine start valve 54 may not accommodate particulate bleed for reasons noted above, and for reasons related to stresses associated with particulate offtake. As such, particulate offtake valve 34 may be more tolerant of particulate laden flow streams and may completely or nearly completely close/stop airflow after repeated cycles of open operation with high particulate concentrations.

In the example of FIG. 4, gas turbine engine 10 is aligned vertically for takeoff and landing and the bottom of manifold 52 is denoted by dashed line 52. Particulate offtake valve 34 is aligned with the lowest surfaces of manifold 52 to allow gravitational forces to facilitate particulate extraction (which is similar, for sand particulate matter, to flow of a liquid stream). Manifold 52 may be further have a physical geometry or, in other words, shape that facilitates movement (or, draining) of sand using the gravitational flow into the opening between manifold 52 and particulate outtake valve 34. Example changes to the geometry of manifold 52 may include increased width and height, while also designing the surface of manifold 52 coupling with particulate outtake valve 34 is coincident with the bottom surface of manifold 52 during vertical engine orientation in order to allow the gravitation component of the flowing particulate to pass through the flange opening to particulate outtake valve 34 and particulate outtake pipe 30.

Although not shown in the example of FIG. 4, particulate outtake pipe 30 may protrude through a nacelle wall housing gas turbine engine 10 to exhaust the particulate laden air stream outside of the nacelle.

Controller 70 may represent processing circuitry for controlling operation of particulate outtake valve 34. Processing circuitry may include one or more digital signal processors (DSPs), general purpose microprocessors, application specific integrated circuits (ASICs), graphics processing units, field programmable logic arrays (FPGAs), electronic control units (ECUs), or other equivalent integrated or discrete logic circuitry. Accordingly, the term "processor" or "processing circuitry," as used herein may refer to any of the foregoing structure or any other structure suitable for implementation of the techniques described herein with respect to controller 70. In addition, in some aspects, the functionality described herein may be provided within dedicated hardware and/or software modules. Also, the techniques could be fully implemented in one or more circuits or logic elements.

In addition, the techniques of this disclosure discussed with respect to controller 70 may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

More information regarding operation of controller 70 is described below with respect to the example of FIG. 5. Briefly, however, controller 70 may obtain signals indicative of certain operating conditions of the vehicle to which gas turbine engine 10 is coupled. Controller 70 may process the signals indicative of operating conditions of the vehicle and control particulate offtake valve 34 to open at a first time, such as when the signals indicate that the engine is idling, the vehicle is taking off, the vehicle is climbing, and/or the vehicle is landing.

Although described as controller 70 analyzing the signals, different processing circuitry may perform the analysis and indicate to controller 70 that particulate outtake valve 34 should be opened. Responsive to the indication, controller 70 may then interface with particulate outtake valve 34 to open particulate outtake valve 34. Moreover, in some instances, controller 70 may receive an override signal either from safety systems or from a manual interaction with a switch or other input interface from a pilot of the vehicle. Controller 70 may also identify safety issues with maintaining the current state of particulate outtake valve 34, rather than rely on safety systems or other types of systems of the vehicle. For example, controller 70 may determine or otherwise obtain an indication for maximum power that overrides the open state of particulate outtake valve 34.

In any event, at some later time, controller 70 may control particulate outtake valve 34 to close particulate outtake valve 34 at a second time (which may be after the first time). In some instances, controller 70 may again analyze signals indicative of certain operating conditions of the vehicle. Controller 70 may process the signals to determine the operating conditions of the vehicle, receive a signal from a different controller that instructs controller 70 to close the valve, receive a signal in the form of an override, etc. as discussed above with respect to opening particulate outtake valve 34. Regardless of how controller 70 determines to close particulate outtake valve 34, controller 70 may interface with particulate outtake valve 34 to close particulate outtake valve 34.

Figure 5:
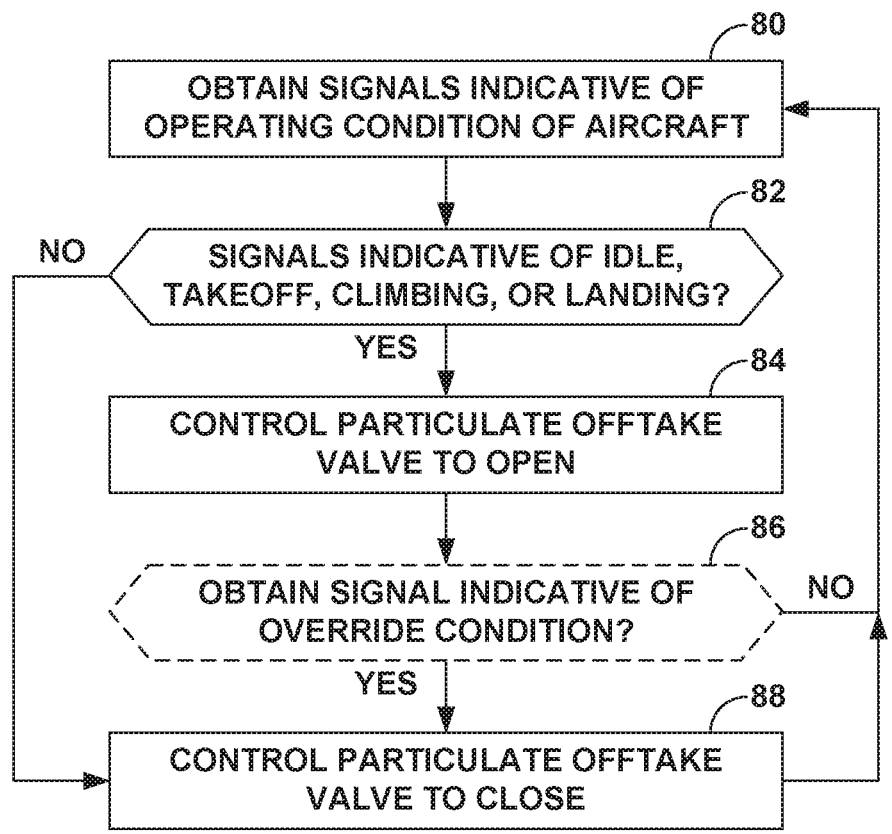
FIG. 5 is a flowchart illustrating example operation of the controller shown in FIG. 5 in controlling compressor particulate offtake in accordance with various aspects of the techniques described in this disclosure.

FIG. 5 is a flowchart illustrating example operation of the controller shown in FIG. 5 in controlling compressor particulate offtake in accordance with various aspects of the techniques described in this disclosure. Controller 70 may first obtain signals indicative of an operating condition of the aircraft to which gas turbine engine 10 is coupled (80). Examples of the signals may include whether flaps are deployed, whether landing gear is deployed (in retractable landing gear aircraft), an altitude of the aircraft, a speed of the aircraft, a direction of travel of the aircraft, etc.

Controller 70 may determine whether the signals are indicative of idle, takeoff, climbing, or landing (82), where idling, takeoff, climbing and landing are each examples of an operating condition of the aircraft. For example, when the signals indicate that the flaps are deployed, the landing gear is deployed, and the speed is decreasing or within some threshold speed at an altitude within a threshold altitude (e.g., 200 feet), controller 70 may determine that the aircraft is landing.

As another example, when the signals indicate that the flaps are deployed, the landing gear is deployed, and the speed is increasing at an altitude within the threshold altitude, controller 70 may determine that the aircraft is taking off and/or climbing. As yet another example, when the signals indicate that the flaps are not deployed, the landing gear is deployed, and the speed is below some threshold speed (e.g., 5 knots), controller 70 may determine that the aircraft is idling.

As an additional example specific to tilt-rotor aircraft, controller 70 may determine an angle of the rotor to identify the operating condition of the aircraft. Signals indicative of the rotors being vertical may indicate that the aircraft is idling, taking off, and/or landing, where the distinctions between the three may relate to changes in power being delivered to the rotors. As a further example, some aircraft have an active inlet particle separator which is manually activated. Controller 70 may receive an indication that the active inlet particle separator has been activated, and thereby determine the operating condition as one of idling, landing and/or takeoff.

Responsive to determining that the signals are indicative of idle, takeoff, climbing or landing operating states of the aircraft ("YES" 82), controller 70 may control particulate offtake valve 34 to open particulate offtake valve 34 (84). In some instances, controller 70 may obtain a signal indicative of an override condition (86). For example, when the aircraft is a helicopter, there are instances during landing (approximately 3-5% of helicopter landings) where maximum power may be requested by the pilot. As opening particulate offtake valve 34 may decrease power, controller 70 may, responsive to a signal indicating maximum power ("YES" 86), control particulate offtake valve 34 to close particulate offtake valve 34 (88).

As another example, controller 70 may obtain a signal that a pilot has manually overridden opening of particulate offtake valve 34. Responsive to the signal for manually override opening of particulate offtake valve 34 ("YES" 86), controller 70 may control particulate offtake valve 34 to close particulate offtake valve 34 (88).

After opening particulate offtake valve 34 and, when no signal indicative of an override condition is received ("NO" 86), controller 70 continues to obtain signals indicative of the operating condition of the aircraft (80), and determine whether the signals are indicative of the idle, takeoff, climbing, or landing operational states (82). When the signals are indicative of the idle, takeoff, climbing, or landing operational states ("YES" 82), controller 70 continues in the same state with particulate offtake valve 34 being open (unless the optional override condition is signaled) (84). However, when the signals are not indicative of the idle, takeoff, climbing, or landing operational states ("NO" 82), controller 70 may control particulate offtake valve 34 to close particulate offtake valve 34 (88). The process may continue in this manner with controller 70 obtaining the signals, determining whether to open or close particulate offtake valve 34, and controlling particulate offtake valve 34 in the manner described above (82-88).

Although described with respect to controller 70 obtaining signals indicative of the operating condition of the vehicle in order to control particulate offtake valve 34, controller 70 may operate in other ways to control particulate offtake valve 34. For example, gas turbine engine 10 may include a particulate sensor configured to generate a signal indicative of particulate concentrations in the inlet to gas turbine engine 10. When the signal indicative of particulate concentrations exceed a particulate concentration threshold, controller 70 may control particulate offtake valve 34 to open. When signals indicate of particulate concentrations are at or below the particulate concentration threshold, controller 70 may control particulate offtake valve 34 to close.

Furthermore, controller 70 may perform no analysis and respond to manually entered signals generated through interactions by the pilot of the aircraft with flight control interfaces. Controller 70 may, in this instance, represent a relay configured to interface with particulate offtake valve 34 responsive to the manually entered signals to control particulate offtake valve 34.

Clause 1. A gas turbine engine comprising: a compressor comprising a plurality of compressor stages, wherein each compressor stage comprises a circumferential row of stator vanes and a rotor, wherein an outer circumferential casing of the compressor defines a fluidic opening within or between adjacent compressor stages, and wherein the fluidic opening is configured to receive particulate flowing and air through the compressor and output the particulate and air outside of the gas turbine engine; a combustor in series flow downstream of the compressor; and a turbine in series flow downstream of the combustor.

Clause 2. The gas turbine engine of clause 1, wherein the fluidic opening comprises an annular slot extending substantially continuous about an inner surface of the outer circumferential casing.

Clause 3. The gas turbine engine of clause 1, wherein the fluidic opening comprises a plurality of fluidic openings that together extend discontinuously around an inner surface of the outer circumferential casing.

Clause 4. The gas turbine engine of clause 3, wherein the plurality of fluidic opening are located between adjacent stator vanes in a circumferential row of stator vanes.

Clause 5. The gas turbine engine of any one of clauses 1 to 4, further comprising a particulate offtake valve fluidically coupled to the fluidic opening, wherein the particulate offtake valve is configured to open and close flow of particulates and air through the fluidic opening to outside the gas turbine engine.

Clause 6. The gas turbine engine of clause 5, further comprising a controller configured to control the particulate offtake valve to open and close.

Clause 7. The gas turbine engine of clause 6, wherein the controller is configured to control the particulate offtake valve to open during at least one of takeoff, climbing, or landing and close the valve during cruising.

Clause 8. The gas turbine engine of clause 6 or 7, wherein the controller is configured to control the particulate offtake valve to close in response to a signal indicating a request for maximum power.

Clause 9. The gas turbine engine of clause 6, wherein the controller is configured to control the particulate offtake valve to open in response to a signal from a particle sensor.

Clause 10. The gas turbine engine of any one of clauses 1 to 9, wherein the fluidic opening is between a circumferential row of stator vanes and a rotor.

Clause 11. The gas turbine engine of any one of clauses 1 to 10, wherein the fluidic opening couples to an offtake pipe that extends outside of a nacelle surrounding, at least partially, the gas turbine engine.

Clause 12. The gas turbine engine of any one of clauses 1 to 11, wherein the fluidic opening couples to an offtake pipe at a bottom of a manifold of the gas turbine engine.

Clause 13. The gas turbine engine of any one of clauses 1 to 12, wherein the compressor comprises multiple fluidic opening at different axial locations of the compressor.

Clause 14. The gas turbine engine of any one of clauses 1 to 13, wherein the gas turbine engine is a turboshaft or a turboprop.

Clause 15. The gas turbine engine of any one of clauses 1 to 14, further comprising: a particulate outtake valve fluidically coupled to the slot; and a controller configured to: control the particulate offtake valve to open at a first time; and control the particulate offtake valve to close at a second time.

Clause 15. A method comprising: controlling, by a controller, a particulate offtake valve to open at a first time, wherein the particulate offtake valve is fluidically coupled to a fluidic opening defined in an outer circumferential casing of a compressor of a gas turbine engine, wherein the gas turbine engine comprises the compressor, a combustor in series flow downstream of the compressor, and a turbine in series flow downstream of the combustor, wherein the compressor comprises a plurality of compressors stages, wherein each compressor stage comprises a circumferential row of stator vanes and a rotor, wherein the fluidic opening is within a compressor stage or between compressor stages; and controlling, by a controller, the particulate offtake valve to close at a second time.

Clause 16. The method of clause 15, wherein the first time corresponds to at least one of takeoff, climbing, or landing of an airframe to which the gas turbine engine is attached.

Clause 17. The method of clause 15 or 16, wherein the second time corresponds to at least one of a full power request or cruising.

Clause 18. The method of any one of clauses 15 to 17, wherein the first time corresponds to at least one of a signal from a particle sensor.

Clause 19. The method of any one of clauses 15 to 18, wherein the fluidic opening comprises an annular slot extending substantially continuous about an inner surface of the outer circumferential casing.

Clause 20. The method of any one of clauses 15 to 18, wherein the fluidic opening comprises one or more of a plurality of slots and a plurality of holes, each of which extend together extend discontinuously around an inner surface of the outer circumferential casing, wherein the plurality of holes are one or more of circular, angled, and shaped, and the plurality of slots are one or more of angled and shaped.

Clause 21. The method of clause 20, wherein the plurality of fluidic opening are located between adjacent stator vanes in a circumferential row of stator vanes.

Clause 22. The method of any one of clauses 15 to 21, wherein the compressor comprises multiple fluidic openings at different axial locations of the compressor.

Clause 23. The method of any one of clauses 15 to 22, wherein the gas turbine engine is a turboshaft or a turboprop.

Various examples have been described. These and other examples are within the scope of the following claims.

What is claimed is:

1. A gas turbine engine comprising:
a compressor comprising a plurality of directly adjacent compressor stages, wherein each compressor stage comprises a circumferential row of stator vanes and a rotor, wherein the rotor of each of the plurality of compressor stages are mechanically coupled to and driven by a shaft, wherein an outer circumferential casing of the compressor defines a fluidic opening within or between adjacent compressor stages of the plurality of compressor stages,
wherein the fluidic opening is configured to receive particulate and air flowing through the compressor and output the particulate and air outside of the gas turbine engine, and
wherein the fluidic opening comprises a slot that is bounded by a forward wall, rearward wall, and a top wall extending therebetween,
the forward wall is a radially straight wall extending upward from an inner surface of the outer circumferential casing to a step of the top wall,
the top wall is a horizontally flat wall extending from the forward wall to the rearward wall, and
the rearward wall is a diagonal wall, bounded on the inner surface of the outer circumferential casing by a portion of the outer circumferential casing that overhangs a portion of the slot extending from an axially rearward end of the fluidic opening in an axially forward direction towards a leading edge;
a particulate offtake valve fluidically coupled to the fluidic opening,
wherein the particulate offtake valve is configured to open and close flow of particulates and air through the fluidic opening to outside the gas turbine engine, and
wherein the particulate offtake valve is separate from a bleed valve;
a combustor in series flow downstream of the compressor; and
a turbine in series flow downstream of the combustor.

2. The gas turbine engine of claim 1, wherein the slot of the fluidic opening comprises an annular slot extending substantially continuous about the inner surface of the outer circumferential casing.

3. The gas turbine engine of claim 1, wherein the fluidic opening comprises a plurality of fluidic openings that together extend discontinuously around the inner surface of the outer circumferential casing.

4. The gas turbine engine of claim 3, wherein the plurality of fluidic openings are located between adjacent stator vanes in the circumferential row of stator vanes.

5. The gas turbine engine of claim 1, further comprising a controller configured to control the particulate offtake valve to open and close.

6. The gas turbine engine of claim 5, wherein the controller is configured to control the particulate offtake valve to open during at least one of takeoff, climbing, or landing and close the valve during cruising.

7. The gas turbine engine of claim 5, wherein the controller is configured to control the particulate offtake valve to close in response to a signal indicating a request for maximum power.

8. The gas turbine engine of claim 5, wherein the controller is configured to control the particulate offtake valve to open in response to a signal from a particle sensor.

9. The gas turbine engine of claim 1, wherein the fluidic opening is between the circumferential row of stator vanes and the rotor.

10. The gas turbine engine of claim 1, wherein the fluidic opening couples to an offtake pipe that extends outside of a nacelle surrounding, at least partially, the gas turbine engine.

11. The gas turbine engine of claim 1, wherein the fluidic opening couples to an offtake pipe at a bottom of a manifold of the gas turbine engine.

12. The gas turbine engine of claim 1, wherein the compressor comprises multiple fluidic opening at different axial locations of the compressor.

13. The gas turbine engine of claim 1, further comprising a controller configured to:
control the particulate offtake valve to open at a first time; and
control the particulate offtake valve to close at a second time.

14. The gas turbine engine of claim 1, further comprising:
a low pressure turbine coupled to a low pressure spool;
a high pressure turbine coupled to a high pressure spool;
wherein the compressor comprises a high pressure axial-centrifugal compressor that couples to the high pressure spool, wherein the high pressure axial-centrifugal compressor includes a plurality of internal stages that each comprise a circumferential row of stator vanes adjacent to a circumferential row of rotor blades, and wherein the slot is displaced in a middle or later internal stage of the plurality of internal stages of the high pressure axial-centrifugal compressor in terms of fluidic flow through the high pressure axial-centrifugal compressor.

15. A method comprising:
controlling, by a controller, a particulate offtake valve to open at a first time,
wherein the particulate offtake valve is fluidically coupled to a fluidic opening defined in an outer circumferential casing of a compressor of a gas turbine engine,
wherein the gas turbine engine comprises the compressor, a combustor in series flow downstream of the compressor, and a turbine in series flow downstream of the combustor, wherein the compressor comprises a plurality of directly adjacent compressors stages, wherein each compressor stage comprises a circumferential row of stator vanes and a rotor, wherein the rotor of each of the plurality of compressor stages are mechanically coupled to and driven by a shaft,
wherein the fluidic opening is within a compressor stage or between compressor stages of the plurality of compressor stages, wherein the fluidic opening comprises a slot that is bounded by a forward wall, rearward wall, and a top wall extending therebetween, the forward wall is a radially straight wall extending upward from an inner surface of the outer circumferential casing to a step of the top wall, the top wall is a horizontally flat wall extending from the forward wall to the rearward wall, and the rearward wall is a diagonal wall, bounded on the inner surface of the outer circumferential casing by a portion of the outer circumferential casing that overhangs a portion of the slot extending from an axially rearward end of the fluidic opening in an axially forward direction towards a leading edge;

wherein the particulate offtake valve is separate from a bleed valve; and controlling, by a controller, the particulate offtake valve to close at a second time.

16. The method of claim 15, wherein the first time corresponds to at least one of takeoff, climbing, or landing of an airframe to which the gas turbine engine is attached.

17. The method of claim 15, wherein the second time corresponds to at least one of a full power request or cruising.

18. The method of claim 15, wherein the first time corresponds to at least one of a signal from a particle sensor.

19. The method of claim 15, wherein the slot comprises one or more of a plurality of slots and a plurality of holes, each of which together extend discontinuously around the inner surface of the outer circumferential casing, wherein the plurality of holes are one or more of circular, angled, and shaped, and the plurality of slots are one or more of angled and shaped.

* * * * *